United States Patent [19]

Stone

[11] Patent Number: 4,462,618
[45] Date of Patent: Jul. 31, 1984

[54] PREFABRICATED DOUBLE-WALLED METAL CHIMNEY

[75] Inventor: Richard L. Stone, Los Altos, Calif.

[73] Assignee: Wallace Murray Corporation, Belmont, Calif.

[21] Appl. No.: 244,033

[22] Filed: Mar. 16, 1981

[51] Int. Cl.³ .................................. F16L 59/14
[52] U.S. Cl. ........................... 285/47; 138/149; 285/64; 285/319; 285/424
[58] Field of Search ............... 285/47, 3, 424; 137/72, 137/74; 138/149

[56] References Cited

U.S. PATENT DOCUMENTS

| | | | |
|---|---|---|---|
| 2,650,112 | 8/1953 | Kinkead | 285/47 |
| 2,894,537 | 7/1959 | Carr | 285/47 X |
| 2,937,662 | 5/1960 | Green | 285/47 |
| 3,170,544 | 2/1965 | Kinkead et al. | 285/424 X |
| 3,575,445 | 4/1971 | French | 285/47 |
| 3,850,453 | 11/1974 | Bentley et al. | 285/47 |
| 3,889,715 | 6/1975 | Lilja et al. | 138/149 X |
| 4,029,344 | 6/1977 | Stone | 285/47 |
| 4,139,005 | 2/1979 | Dickey | 137/74 X |

FOREIGN PATENT DOCUMENTS 801162  9/1958  United Kingdom .................... 285/3

Primary Examiner—Thomas J. Callaghan
Attorney, Agent, or Firm—Owen, Wickersham & Erickson

[57] ABSTRACT

A metal chimney comprised of prefabricated double-walled sections packed with compressible mineral fiber insulation material between the inner and outer metal walls. Each section has a male end and a female end constructed so that a plurality of sections can be interconnected together end-to-end and will maintain structural integrity while also reducing heat conductivity and gas leakage from the inner wall to the outer wall. The female end of each section has a flexible, diaphragm like insulation retainer and seal, while the male end utilizes a rigid spider comprised of spaced apart spoke portions between inner and outer walls in combination with an annular wafer of thin nonmetallic sheet material. After insulation, the flexible diaphragm seal is compressed against the rigid spider and annular wafer allowing the insulation to form a gas seal, which is maintained even if these wafers or diaphragm seals are consumed by chimney heat.

17 Claims, 16 Drawing Figures

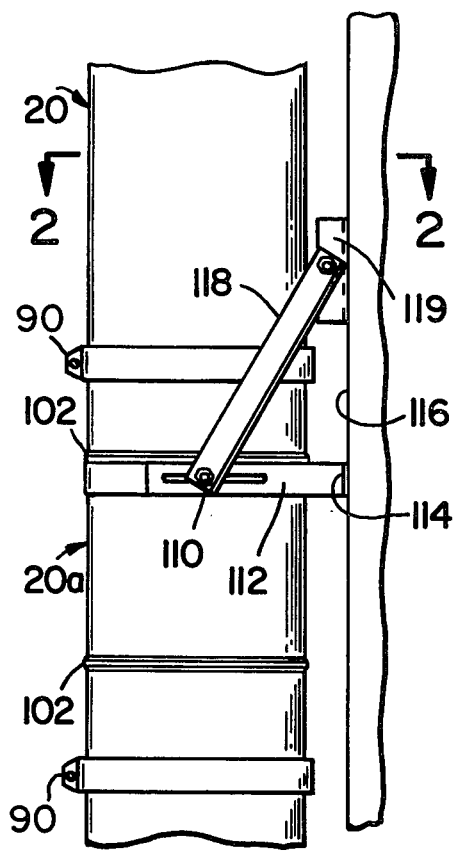
FIG_1
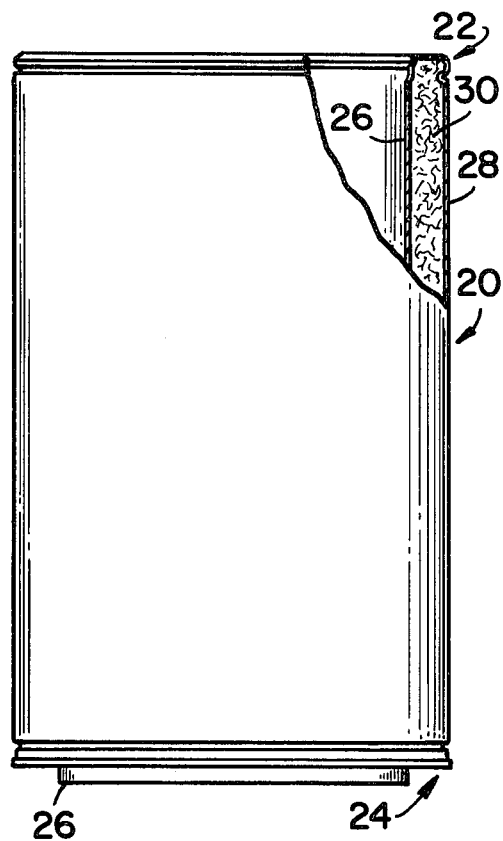
FIG_3
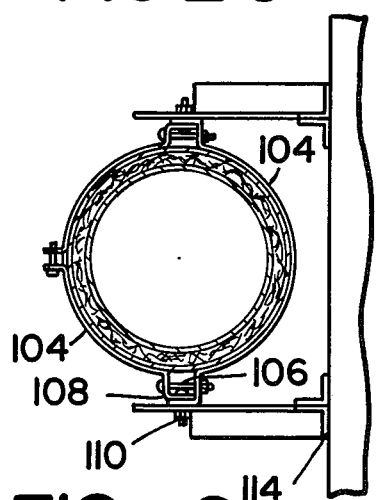
FIG_2
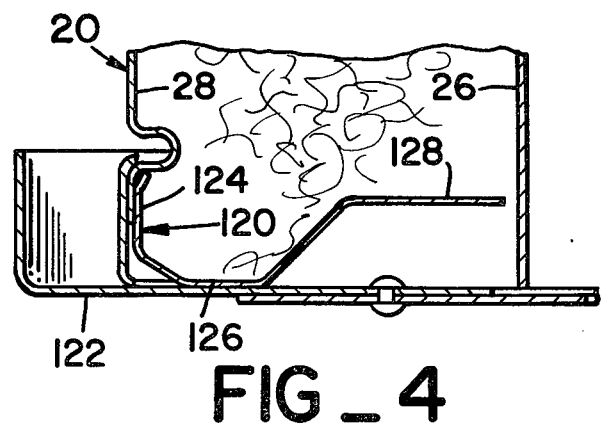
FIG_4

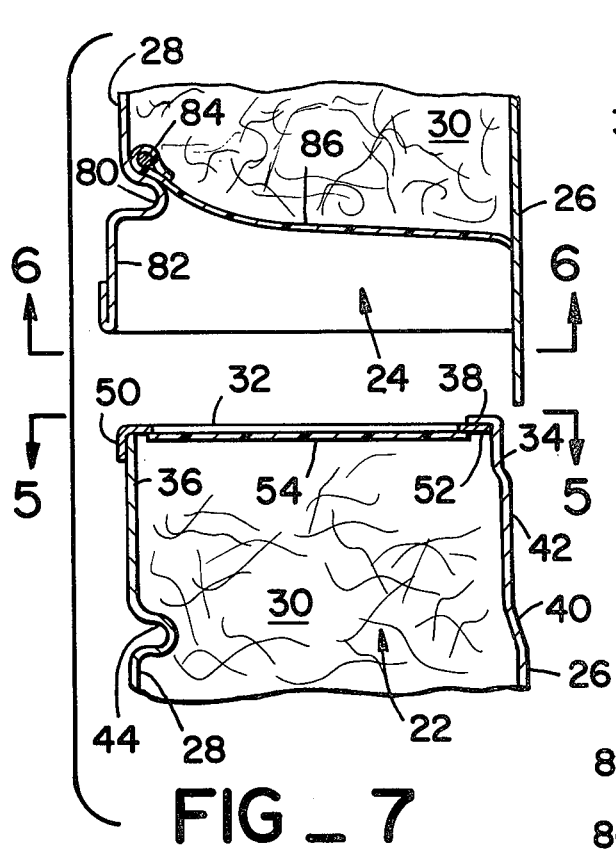
FIG_7
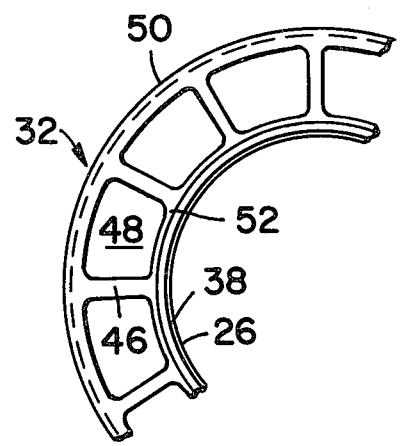
FIG_5
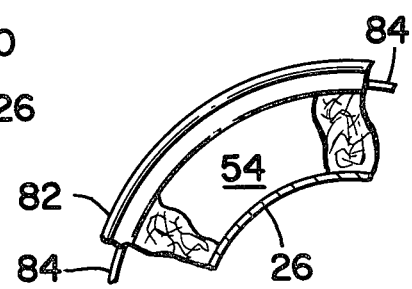
FIG_6
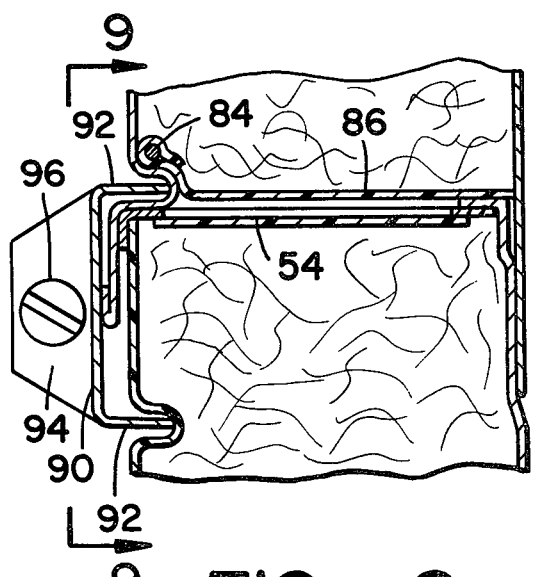
FIG_8
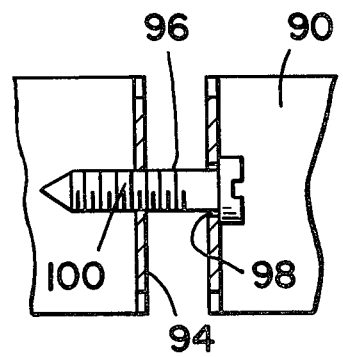
FIG_9

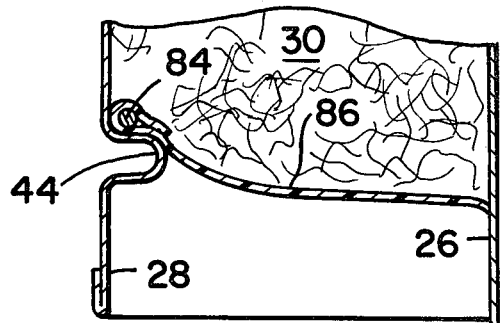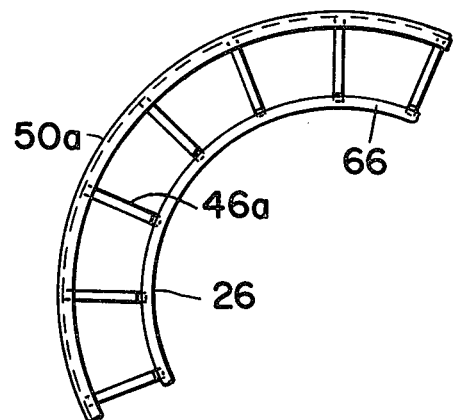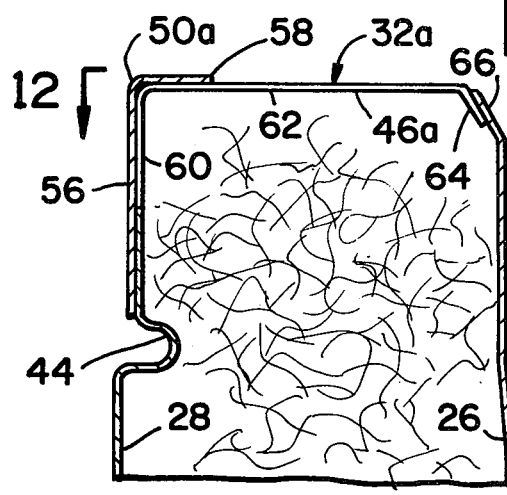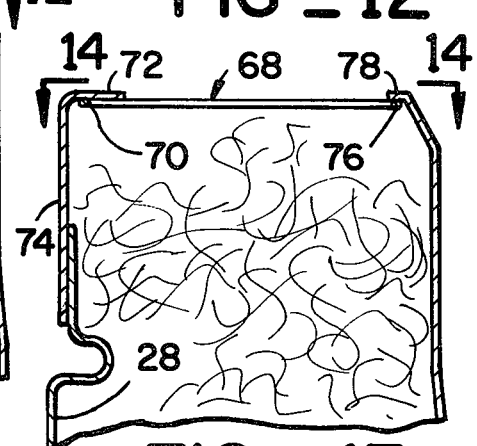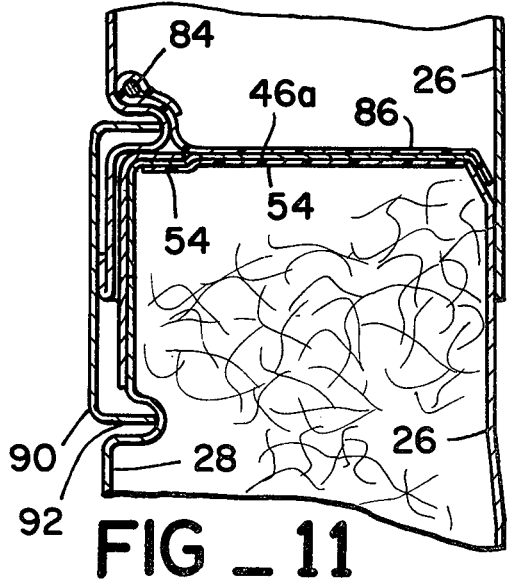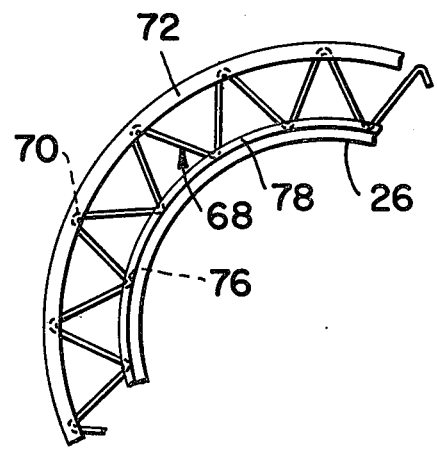

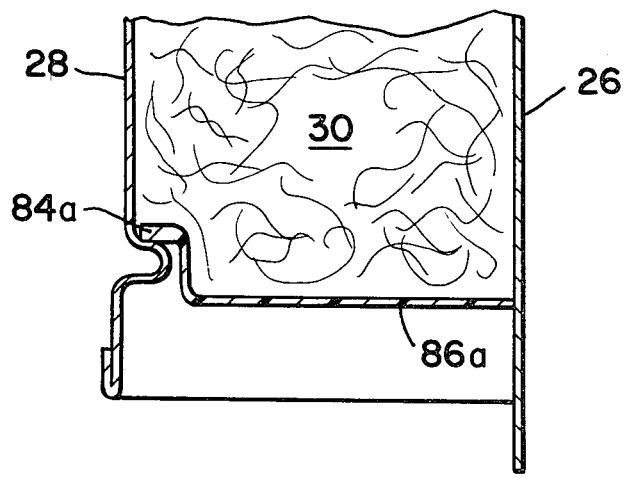
FIG _ 15
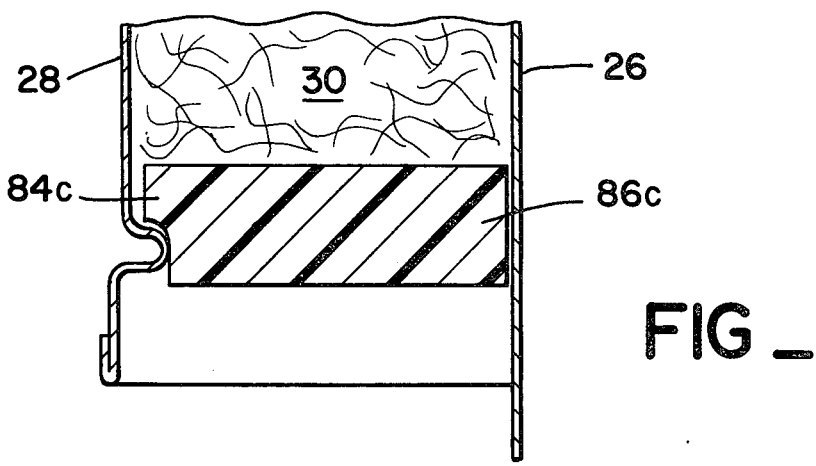
FIG _ 16

PREFABRICATED DOUBLE-WALLED METAL CHIMNEY

BACKGROUND OF THE INVENTION

This invention relates to an improved prefabricated metal chimney of the type comprised of a plurality of similar chimney sections connectable in an end-to-end relationship.

Such prefabricated chimneys have been widely used in the past because of their inherent advantages over conventional masonry chimneys, including their economy and ease of installation. Despite the relatively high state of development of such chimney structures as exemplified by my previous U.S. Pat. Nos. 4,029,344, 4,029,343, and 3,902,744, certain problems have challenged the increased need for improvements. One problem which arose was in preventing or at least reducing to a minimum the conductivity of heat from the inner pipe to the outer pipe while also maintaining the necessary structural integrity at the ends of each chimney and thus at the joint or connected sections. The use of metal end caps or annular flanges on each section in previous prefabricated chimney devices provided adequate structural integrity but also created a natural path for high heat conductivity and often caused hot spots on the outer surface of an erected chimney. The present invention serves to minimize this problem and provide a more efficient and long-lasting chimney.

Another problem with prefabricated metal chimneys formed with interconnected prefabricated chimney sections was in forming and maintaining an adequate gas seal at the joint connections of such sections. In previous chimney designs the mating end couplings of the chimney sections comprised primarily metal parts that not only conducted a large amount of heat but also tended to create gaps or channels due to normal mismatching tolerances of components which were often increased by their expansion and contraction from heat changes. The escape of gas through such joint gaps or channels could become intolerable for most chimney installations.

BRIEF SUMMARY OF THE INVENTION

In accordance with the principles of the present invention, a prefabricated chimney section is provided which solves the aforesaid problems and can be joined together with other like sections to assemble a chimney of any desired length within a building structure, assuming that it is provided with suitable external supporting means. Each chimney section has cylindrical, spaced-apart inner and outer walls which form an annular cavity within which is a suitable insulation material such as mineral wool. Also, each section has a male coupling at one end and a female coupling at its other end to facilitate the end-to-end interconnection of a plurality of sections. In accordance with the invention, at the male coupling end, the inner and outer walls are formed and held somewhat closer together (than at the female coupling end) by an annular spider member having radial spoke portions extending between inner and outer circular flanges. This spider member may be welded or otherwise attached to the edges of the inner and outer walls at their male ends. A thin, plastic or other nonmetallic annular-shaped wafer member is preferably secured to or placed on the underside of the spider to close the openings between its radial spokes and thus the male end of the chimney section. This enables the insulation material to be packed into each chimney section from its female end and to be retained by the wafer member and spider at its male end. At the female end of each chimney section, the inner and outer wall members are somewhat farther apart than at the male coupling end and extending between them is a flexible, or movable, annular non-metallic closure member. With the annular cavity of the chimney section filled with insulation material, this annular member, which is mounted over a wire ring is retained in place by a circular bead in the outer wall member, and the central portion is free to move with respect to the inner wall member. When a male coupling end of one chimney section is forced into the female coupling end of another aligned chimney section, the flexible closure member of the female coupling is pushed flat against the spider spoke portions of the male coupling. Thus, the packed insulation material of the two adjoining chimney sections is separated only by the flexible closure of the female end and the spider and the relatively thin underlying wafer of the connected male end. The annular closure and wafer members may be made of a plastic material that may actually be rapidly consumed after chimney installation when the surrounding material reaches an elevated temperature during its initial use. Thereafter, the insulation of adjoining sections is essentially continuous and forms an effective gas seal. Moreover, the only path for heat conduction between the inner and outer walls of the chimney at each section joint is along the spokes of a spider. Since these spokes are relatively narrow and thin, such heat conduction is minimal and the problem of an excessive temperature rise or hot spots on the outer wall is eliminated. To facilitate assembly of the chimney sections, the outer wall of each section is provided with grooves at both ends to accommodate a channel shaped connecting band that reinforces adjoined sections in the conventional manner.

In summary, one object of the present invention is to provide an improved prefabricated, double-walled chimney comprised of connectable sections which when assembled and installed provide a chimney with essentially continuous insulation between its walls and a minimum of heat conductive structural elements between walls at the section joints.

Another object of the present invention is to provide a prefabricated chimney in which the compressibility of the packed insulation retained by the flexible seal at the female end provides a gas seal to minimize escape of chimney gases under unfavorable or positive internal pressure conditions.

Another object of this invention is to provide a coupler spider assembly which can be fabricated without material waste and will position the inner flue pipe without imposing thermal expansion stresses which might cause damage at high operating temperatures.

Another object of this invention is to provide a prefabricated insulated chimney with a joint connection between sections which directly connects one load-bearing outer pipe section to the next and will transmit compressive thrust loads directly, as well as provide strength in loading when cantilevered horizontally and tensile load transfer when the chimney is suspended from above.

Still another object of the invention is to provide a prefabricated metal chimney comprised of interconnected sections that are particularly well-adapted for ease and economy of manufacture.

Other objects, advantages and features of the invention will become apparent from the following detailed description of one embodiment thereof, presented in conjunction with the drawing.

BRIEF DESCRIPTION OF THE DRAWING

FIG. 1 is a view in elevation showing a portion of a prefabricated chimney comprised of a plurality of interconnected sections embodying principles of the present invention;

FIG. 2 is a view in section taken along the line 2—2 of FIG. 1;

FIG. 3 is a view in elevation of one chimney section according to the invention with portions broken away;

FIG. 4 is a fragmentary view in elevation showing a bottom closure for the chimney of FIG. 1;

FIG. 5 is a fragmentary end view taken along line 5—5 of FIG. 7 showing one form of the male coupling end of a chimney section according to the invention;

FIG. 6 is a fragmentary end view taken along line 6—6 of FIG. 7 showing the female coupling end of the chimney section;

FIG. 7 is an enlarged fragmentary and exploded view in section showing portions of adjoining chimney sections just before being connected;

FIG. 8 is an enlarged fragmentary view in section showing portions of the adjoining chimney sections of FIG. 7 just after being connected; and FIG. 9 is a fragmentary view of the connecting band for two adjoining chimney sections taken along line 9—9 of FIG. 8;

FIG. 10 is a fragmentary and exploded view in section showing portions of adjoining chimney sections before being connected and having a modified form of male end coupling according to the invention;

FIG. 11 is a fragmentary view similar to FIG. 10, but showing the adjacent chimney sections connected;

FIG. 12 is an end view taken along line 12—12 of FIG. 10 and showing a modified spider construction according to the invention;

FIG. 13 is a fragmentary view in elevation showing a male end portion of a chimney section with another modified form of spider construction; and FIG. 14 is a fragmentary end view at reduced scale taken along line 14—14 of FIG. 13.

FIG. 15 is a fragmentary view in section of a modified form of female end for my chimney section; and FIG. 16 is a fragmentary view in section of another modified form of female end for my chimney section.

DETAILED DESCRIPTION OF EMBODIMENT

With reference to the drawing, FIGS. 1 and 2 show a portion of an assembled metal chimney comprised of a series of interconnected prefabricated chimney sections 20 embodying the principles of the present invention. The assembled chimney may have any desired number of sections and it may be supported by a suitable system of external brackets or the like which can be attached to surrounding building structure.

As shown in FIG. 3, each chimney section has a generally cylindrical shape with a male coupling 22 at one end and a female coupling 24 at its opposite end. It has a cylindrical inner wall 26 and an outer wall 28 spaced outwardly therefrom to form an annular cavity which is filled with a suitable insulation material 30 such as mineral wool.

In the embodiment shown in FIGS. 5 to 7, the male coupling 22 is formed by an annular shaped spider member 32 that bridges across and between upper end portions 34 and 36 of the inner and outer wall members respectively. The upper end portion 34 of the inner wall member includes a radially extending flange portion 38. Spaced downward from the upper end portion 34 is a shoulder 40 that forms a short end wall portion 42 having a slightly greater diameter than that of the main portion of the inner wall member 26. Spaced below the edge of the upper end portion 36 of the outer wall member 28 is an annular indentation or groove 44. In this embodiment the top edges 34 and 36 of both inner and outer walls are interconnected by the annular spider member 32. As shown in FIG. 5, the spider member has spaced apart and relatively narrow radial spoke members 46 between which are openings 48 of substantially greater width. The outer ends of the spider spokes 46 are connected by an integral annular flange 50 that is bent at a right angle so that it will fit around and be spot welded to the outer edge of the upper end portion 36 of the outer wall. The inner ends of the spider spokes are connected to an integral flange 52 that fits under and is spot welded to the flange 38 of the inner wall end portion 34. The spider member 32 is preferably made of relatively thin sheet metal having a uniform thickness (e.g. 0.012 inches) and the spoke members 46 are only wide enough to afford the necessary strength and rigidity required for the chimney section. For example, for chimney sections having an outside diameter of around 12 inches, 12 spokes having a width of around 0.25 inches are sufficient. These thin and narrow spokes are thus comprised of a relatively small amount of metal and do not allow a high rate of heat conduction from the inner wall to the outer wall. Adjacent to the underside of the spider is a thin annular wafer 54 of nonmetallic material such as a suitable plastic that covers the openings 48 between spoke members 46 and temporarily closes the annular male coupling. Once the male end coupling is formed with the spider member 32 and wafer 54 in place, the insulation material 30 for the chimney can be installed from the other end of the chimney section.

In another embodiment of the invention a spider member 32a may be constructed somewhat differently, as shown in FIGS. 10–12, by forming a single annular outer ring 50a with individual or integrally formed circumferentially spaced apart fingers 46a extending radially inwardly therefrom. As shown in FIG. 10, the outer ring 48a has a right annular cross section formed by a vertical or cylindrical portion 56 integral with an annular, horizontal portion 58 extending inwardly from its upper end. Each finger 46a has an outer vertical flange portion 60 and an inner donwardly sloping flange portion 64. The outer vertical flange portion fits inside the outer ring against its vertical portion 56 and is spot welded or otherwise secured to it. The inner flange portion 64 of each finger lies flush against an upwardly sloping annular flange portion 66 forming the upper edge of the inner wall member 26 and these flange portions are also spot welded or otherwise secured together. This structural arrangement is particularly adaptable for conventional sheet metal materials having no surface treatment that would prevent or inhibit spot welding.

In lieu of the individual spokes or fingers 46a, a wire grid 68 may be used in another modified male end coupling illustrated in FIGS. 13 and 14. As shown, a continuous wire is bent to form a pattern of alternating outer and inner obtuse angles. Outer point portions 70 of this grid extend under the horizontal flange 72 of an outer ring 74 and are spot welded thereto. The ring 74 is itself spotwelded to the outer wall 28. The inner point portions 76 of the grid are similarly spotwelded to a horizontal flange portion 78 on the upper edge of the inner wall member 26. The wire for the grid may be a relatively stiff but slender material (e.g., stainless steel) and since it comprises a very small amount of heat conductor, it, like the metal fingers or spokes 46 and 46a allows only an insignificant amount of conductive heat transfer from the inner wall to the outer wall of the chimney section.

At the female end of each chimney section 20, its inner wall 26 has a cylindrical shape with a constant diameter and terminates with a plain edge. The outer wall 28 is formed with an annular indentation or groove 80 similar to the male end groove 44. Below this latter groove is a skirt portion 82 whose diameter is somewhat greater but whose length is only slightly less than the short upper end portion 36 of the male coupling. Retained by the inwardly projecting bead that forms the groove 80 is a wire or molded plastic ring 84 to which is attached a flexible annular end retainer member 86. The wire or molded plastic ring has a diameter only slightly less than the inside diameter of the outer wall 28 so that it can be readily snapped into place and secured by the projecting bead 80. The outer edge of flexible cover member 86 is integral with the plastic ring or is fastened to the wire ring by looping it around and attaching it, as by heat sealing or an adhesive, back to the flexible material near the inside of the ring. The end cover member is preferably made from a relatively thin, nonmetallic material, such as a suitable sheet plastic material, and though flexible, it has a degree of tensile strength which helps to retain the insulation material within the annular cavity of the chimney section during shipment and storage.

A somewhat modified end retainer 86a, as shown in FIG. 15, comprises an annular shaped, flexible plastic member with an integral right angle portion along its outer edge including a radially extending flange portion 84a of somewhat increased thickness that fits over the bead 80 and serves the same function as the ring 84.

Yet another form of end retainer, designated by numeral 86c, is shown in FIG. 16. This embodiment comprises an annular plug member that is more rigid and considerably thicker than the previously described female end retainer. This annular plug is preferably made from compressed fibrous or blanket type insulation material of the well known type. It also has a notched-out portion along its outer edge to form a flange 84c that fits over the outer wall bead 80.

All of the aforementioned end covers are either flexible or movable, so that when the male and female end portions of adjoining chimney sections are connected together, the insulation material in both sections will become packed closely together to provide insulation continuity and good gas sealing at all chimney section joints.

After the chimney sections are installed, the retainer members 86 or 86a of the female section, as well as the annular retainer wafer 54 of each male retainer, may become essentially dissolved or consumed by the normal heat generated within the chimney. This enables the insulation material of adjoining sections to merge even closer together around the spider spokes or grid and essentially form a continuous insulation body at adjoining chimney sections and assure a more effective gas seal than the fit-up of usual metal parts.

In manufacturing each chimney section, the inner and outer wall members 26 and 28 are formed and connected by the spider 32 of the male coupling before the annular cavity is slightly over filled with insulation material 30 using an auger-type filler or feeder. Once filled, the chimney section is closed at its female coupling end by installation of the wire or plastic molded ring 84 and the attached flexible cover member 86. This installation is performed simply by pressing the assembly progressively under the bead member that forms the groove 80. The inner edge 88 of the cover member remains free but will turn down and lie against the inner wall member 26.

Now, when the male coupling is forced into the female coupling, as shown in FIGS. 7 and 11, the flexible annular retainer member 86 is pushed upwardly against the compressible insulation material and becomes flush with the spider member on the male end of the coupling section. Along the inner wall the lower end portion of the female lower wall portion slides adjacent the upper end portion 42 of the male inner wall and is stopped by the bead member 80. Thus, as previously discussed, only a relatively thin laminated structure is formed between the tightly packed insulation of the adjoining chimney sections. The plastic material of the end retainers 54 and 86 are normally consumed by chimney heat and the only metal conductive heat transfer that can occur between the inner and outer walls is through the thin, narrow spokes 46 and 46a or the wire grid 68 of the spider member. Since this volume of metal material is relatively small, the resultant heat transfer is minimal.

In a typical chimney installation, once the chimney sections 20 are coupled together, they are secured by a connecting exterior band 90, as shown in FIG. 8. This band has a channel shaped cross section with upper and lower flanges 92 that fit within the grooves 44 and 80. At the ends of the band are outwardly projecting flanges or tabs 94 which are drawn together by a take-up screw 96 that extends through an enlarged opening 98 in one tab and is threaded into another opening 100 in the outer tab. When tightened in place, the band 90 affords increased strength, rigidity and security to the chimney structure.

As stated previously, when installed, the assembled chimney may be readily attached to and supported by adjacent building structure, as shown in FIGS. 1 and 2. To facilitate the attachment and positioning of supporting brackets, one chimney section 20a may be provided with one or more outwardly projecting beads 102 spaced from its opposite ends. One of these beads serves to retain a two-piece external band 104 which extends around the chimney section and is clamped together by bolts 106 that are seated in outwardly projecting lug portions 108. Extending outwardly from each lug portion at opposite sides of the chimney is an attaching bolt 110 to which a horizontal bracket member 112 may be adjustably connected. A flange 114 on the end of each bracket member can be readily fixed to adjacent building structure 116. An additional supporting bracket 118 may also be connected to each attaching bolt 110 and extend diagonally upward or downward to be also fixed to the building structure. Other similar forms of support brackets may be used where necessary to support the assembled chimney.

To every chimney installation, the lowermost chimney end of an upright stack or of a suspended section of chimney pipe must be provided with a suitable means for closing and retaining the insulation material in place. As shown in FIG. 4, this closure comprises an annular basecap 120 formed of sheet metal and supported on a rigid base plate 122 that can be readily secured by brackets to available building structure. The annular ring has a cylindrical outer wall 124 that is integral with a horizontal portion 126 adapted to rest on the base plate. Another integral portion 128 with the horizontal portion extends upwardly and inwardly therefrom and then horizontally toward the inner pipe wall, thereby covering the annular cavity between the walls of the chimney section. The cylindrical outer wall 124 is sized in diameter to just fit inside the lower portion of the outer wall 28 of the chimney section 20 and it may be held in place by a circumferential metal band similar to the exterior band 90.

Thus, as described, a chimney comprised of the prefabricated sections 20 not only has structural integrity and is easy to assemble and install, but also provides a high order of insulation efficiency even at the coupling joints.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A prefabricated double-walled chimney section adapted to be connected to a similar section to form a chimney column, said section comprising:
    a cylindrical inner imperforate wall member;
    a cylindrical outer wall member having a greater diameter than and spaced radially outwardly from said inner wall member, thereby forming an annular cavity for a quantity of compressible fibrous insulation material between said inner and outer wall members;
    male coupling means at one end of said section including a plurality of relatively narrow and rigid structural members attached to and extending between end portions of said inner and outer wall members;
    female coupling means at the other end of said section including spaced apart end portions of said wall members for receiving said male coupling means, a flexible and partially movable annular retainer member of relatively low heat conducting material extending between said spaced apart end portions for holding said insulation in place between said inner and outer wall members, and means in said outer wall member for holding said retainer member against the end of the insulation material between said wall members.

2. The double-walled chimney section as described in claim 1 wherein, at the female coupling end, said inner wall member is longer than said outer wall member and said means for holding said retainer member comprises an annular inwardly projecting bead means spaced from the end of said outer wall member that also forms a groove for use in securing connected chimney sections.

3. The double-walled chimney section as described in claim 1 wherein said male coupling further comprises an annular wafer of thin nonmetallic material adjacent the underside of said narrow structural members to help retain said insulation material within said section.

4. The double-walled chimney section as described in claim 1 wherein said male coupling comprises an annular metal spider having inner and outer circular portions fixed to the upper edges of said inner and outer wall members respectively and spaced apart radial spoke members extending between said circular portions.

5. The double-walled chimney section as described in claim 1 wherein said male coupling comprises an annular metal spider having an outer flange portion fixed to said outer wall member and spaced apart finger members extending radially inwardly therefrom with their inner ends fixed to an edge on said inner wall member.

6. The double-walled chimney section as described in claim 1 wherein said male coupling comprises an annular metal spider comprised of a continuous wire grid having portions that criss-cross between said inner and outer wall members, an annular ring means fixed to said outer wall member and to outer extremeties of said wire grid, and flange means on said inner wall member fixed to inner extremeties of said wire grid.

7. The double-walled chimney section as described in claim 1 wherein said annular retainer member for said female coupling comprises an annular wafer of thin plastic material that is normally consumed by heat present in said insulation material during normal operation of a chimney comprised of said sections, and a circular wire hoop at the outer edge of said wafer which is retained by said means for holding said retainer member.

8. The double-walled chimney section as described in claim 1 wherein said annular retainer member for said female coupling comprises a relatively thin annular wafer of molded plastic material having an integral bead portion of increased thickness along its outer periphery that is adjacent said means for holding said retainer member against the insulation material.

9. The double-walled chimney section as described in claim 2, further including a similar inwardly projecting bead and groove near the male coupling end of said section; said grooves being adapted to receive the flanges of a circumferential band for securing two coupled chimney sections together.

10. The chimney as described in claim 9 wherein said flexible annular member in the female coupling of each chimney section is a relatively thin plastic material which will be consumed when subjected to the heat level encountered within the insulation during normal operation of the chimney.

11. The chimney as described in claim 10 wherein each said male coupling of each section includes a thin annular wafer of plastic material located under said structural members of said male coupling which is also consumed by the heat of normal operation of the chimney.

12. The double-walled chimney section as described in claim 1 wherein said flexible annular retainer member for said female coupling comprises an annular wafer of thin nonmetallic and consumable material, and a circular wire hoop at the outer edge of said wafer which is retained by said means for holding said retainer member.

13. A chimney installation comprising:
    a plurality of prefabricated chimney sections connected end-to-end and supported by adjacent building structure, each of said sections comprising:

an inner wall and an outer wall spaced outwardly therefrom and forming an annular cavity filled with insulation material;

a male coupling at one end of each section including a plurality of relatively narrow structural members fixed to and extending between the end edges of said inner and outer walls;

a female coupling at the other end of each section having a flexible, partially movable annular retainer member of relatively low heat conductive material covering said insulation material;

said male coupling of each chimney section being seated within the female coupling of the adjacent section at each junction of two aligned sections, said male coupling being situated so that said narrow structural members of the male coupling are directly adjacent the annular retainer member of said female coupling whereby only the narrow spaced apart structural members will conduct a relatively low level of heat from the inside wall of the chimney to its outside wall.

14. The chimney as described in claim 11 including an annular base cap extending between the inner and outer walls of the lowermost prefabricated section for said chimney, and means for retaining said base cap so that no insulation material can escape from the section.

15. The chimney as described in claim 14 wherein said base cap has a cylindrical outer wall portion that fits inside of and adjacent to a lower outer wall portion of the section and which is integral with and is positioned at a right angle to an annular portion in a plane perpendicular to the axis of the section.

16. The chimney as described in claim 15 wherein said means for retaining said base cap is a cylindrical band with inwardly directed edge flanges.

17. The chimney as described in claim 15 wherein said means for retaining said base cap comprises a base plate extending under said base cap and attached to its annular portion by fasteners.

* * * * *